July 5, 1960
P. F. H. REICHERT
2,943,875
RESILIENT CONNECTION
Filed Jan. 23, 1957
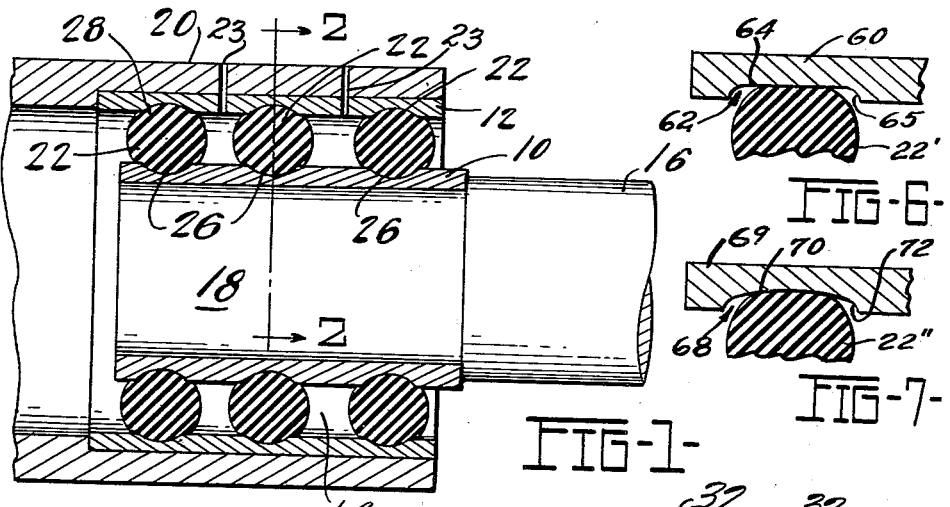
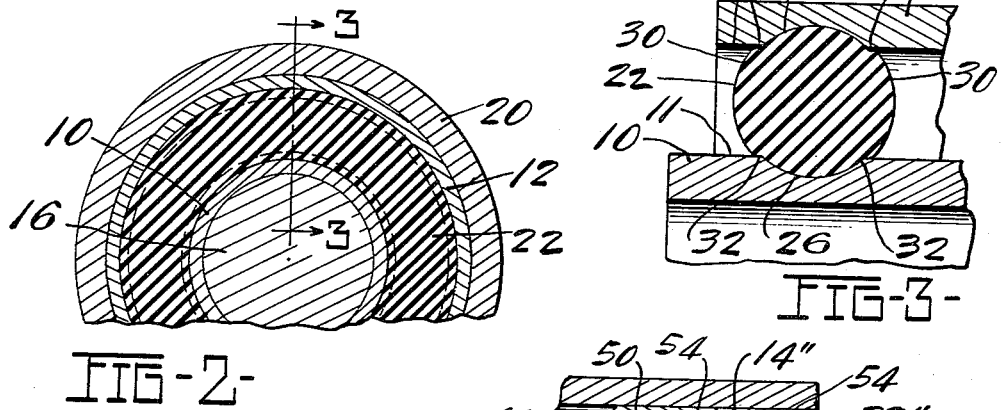
INVENTOR:
PAUL F. H. REICHERT.
BY
Harry C. Ernsberger
ATTY.

United States Patent Office 2,943,875
Patented July 5, 1960

2,943,875
RESILIENT CONNECTION

Paul F. H. Reichert, Ottawa Hills, Ohio, assignor to The Toledo Industrial Rubber Company, Toledo, Ohio, a corporation of Illinois Filed Jan. 23, 1957, Ser. No. 635,858

3 Claims. (Cl. 287—85)

This invention relates to resilient or flexible connections, couplings, or mountings and more especially to connections, couplings or mountings embodying one or more resilient or yieldable components or elements disposed between relatively movable members and adapted to yieldably resist torsional or angular and axial movements of members with which the arrangement of the invention may be used.

The invention embraces the provision of a resilient connection, coupling or mounting construction wherein one or more resilient or yieldable annular elements are disposed in engagement with members or components adapted for or capable of relative movement and wherein the resilient or yieldable elements are disposed to yieldably resist relative torsional, angular and axial movements of the members with which the connection unit is associated.

Another object of the invention is the provision of a connecting or mounting arrangement for use with relatively movable parts or mechanism wherein the arrangement embodies circular surfaces in concentric relation with one or more annular elements of yieldable material disposed between the surfaces and wherein one or both of the surfaces are configurated with depressions or recesses into which the elements extend, the depressions or recesses being of a dimension and shape to resist substantial relative axial movement between the parts or mechanisms, the annular elements being under radial compressive stresses to effectively resist torsional or angular movements between the parts or mechanisms.

Another object of the invention is the provision of a resilient connection or mounting wherein coaxially arranged members are circumferentially spaced one from the other with annular elements of distortable material disposed between the members, the annular elements being preferably of circular or elliptical cross sectional configuration, the elements in assembly being compressed establishing a substantial frictional coefficient with the members providing effective resistance to torsional movement between the members.

Still another object of the invention resides in a mounting construction which is inclusive of members formed with concentric surfaces with annular elements of resilient material disposed between the members and which are preferably unbonded to the members yet are under compression sufficient to present effective resistance to relative movement between the members.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a longitudinal sectional view illustrating a form of resilient connection or mounting construction of the invention;

Figure 2 is a transverse sectional view taken substantially on the line 2—2 of Figure 1;

Figure 3 is an enlarged detail sectional view taken substantially on the line 3—3 of Figure 2;

Figure 4 is a view similar to Figure 1 showing a modified form of the invention;

Figure 5 is a view similar to Figure 4 showing a further modification of the invention;

Figure 6 is a fragmentary sectional view illustrating a modified configuration of mounting construction; and Figure 7 is a view similar to Figure 6 showing another modification.

The arrangement of the invention is particularly usable for connecting members or mounting one member upon another to yieldingly resist relative movement between members, for connecting moving parts where misalignments may be absorbed by the mounting or coupling, or the arrangement may be utilized to absorb or cushion vibrations of one or more components or parts of mechanisms. It is to be understood that the use of the invention is contemplated wherever a resilient connection or mounting is desirable or necessary and the connection or mounting may be fashioned in various sizes depending upon the particular installation or use of the invention.

Referring to the drawings in detail and initially to the form of the invention illustrated in Figures 1 through 3, the resilient connection, mounting, or coupling construction or unit is inclusive of an inner member or circular cylindrical sleeve 10 and an outer member or circular cylindrical sleeve 12, the members or sleeves being spaced apart providing an annular region or chamber 14 between the sleeves. The sleeves 10 and 12 may be connected or associated with one or more components or parts of mechanisms which are to be resiliently supported or connected through the arrangement of the invention. As shown in Figure 1, a shaft, member or component 16 has a tenon portion 18 snugly fitted or press fitted into the inner sleeve or member 10 or otherwise secured thereto and a second member 20 is secured to or associated with the outer sleeve or member 12. The member or component 20 may be fashioned with a bore adapted to snugly receive the outer sleeve or member 12 in the manner shown in Figure 1. The components or members 16 and 20 may be in the form of rotatable means to be connected by the connection or mounting construction of the invention, or one of the components may be a stationary frame or part and the other a mechanism component subject to vibration, torsional, angular or axial movement or may be subject to compound movements or vibrations to be cushioned or attenuated through the medium of the mounting arrangement of the invention.

Means is provided disposed in the space, chamber or region 14 between the sleeves 10 and 12 functioning to yieldably resist relative axial, torsional and angular movements of one of the members with respect to the other.

Such means in the present invention as shown in Figures 1 through 3 includes one or more annularly-shaped or toroidal units, elements or rings 22 formed of yieldable, resilient or distortable material such as rubber, synthetic rubber, resinous plastic or other material having the characteristics of yieldably resisting movement.

In the embodiment shown in Figure 1, three annular elements or components 22 form the yielding resistance medium between the inner and outer sleeves or members 10 and 12, but it is to be understood that a greater or lesser number of elements 22 may be utilized depending upon the character of the installation and the magnitude of axial, angular or torsional thrust to be resisted or absorbed in the mounting or connector construction.

Each of the rubber or resilient units 22 is preferably normally of toroidal shape of substantially circular cross section when in a free or unconfined state. In the embodiment shown in Figure 1, the outer peripheral surface or region of the inner sleeve 10 is formed with peripheral recesses or depressions 26 which as illustrated are of curved or circular contour in cross section substantially the same as the cross sectional curvature of the toroidal unit 22 in its normal incompressed state so that there may be complete or contiguous engagement of the inner surface region of each of the resilient units 22 and the adjacent peripheral recess or depression 26 so as to provide substantial resistance to relative axial movement between the components 10 and 12 of the mounting.

As shown in Figure 1, the inner surface region of the outer sleeve or member 12 is formed or fashioned with depressions or recesses 28 each of which is of a cross sectional curvature the same or similar to that of each of the recesses 26 so as to provide contiguous engagement of the surface of each depression with the adjacent region of a resilient unit 22. The cross sectional thickness of the yieldable unit 22 in uncompressed condition is of slightly greater dimension than the distance between the curved surfaces defining the recesses 26 and 28.

As particularly shown in detail in Figure 3, each unit 22, after assembly between the sleeves 10 and 12, is under radial compression, which causes a distortion or extrusion of the unconfined regions of the unit longitudinally of the sleeves, the elongated or distorted portions being indicated at 30 in Figure 3. The distorted material adjacent the junctures of the depressions 28 with the inner wall 15 of the sleeve 12 and adjacent the junctures of the depressions 26 with the outer cylindrical surface 11 of the sleeve 10 is in engagement or contact with the walls of the sleeves as illustrated at 32 in Figure 3.

The longitudinally distended regions 30 resulting from radial compression of the annular units 22 provides yieldable impediments or abutments presenting or establishing substantial resistance to longitudinal rolling or distortion of the units 22 in directions axially of the sleeves. The outer sleeve and member 12 may be formed with vent openings 23 to relieve air pressure between adjacent annular members.

Hence the cumulative resistance provided at regions 32 where the longitudinally distorted portions 30 engage the opposed walls of the sleeves sets up a substantial degree of resistance to axial or endwise as well as angular relative movement between the sleeves and the members or components 16 and 20 associated therewith.

The transverse compression stresses in the units 22 establish substantial friction between the walls of the recesses 26 and 28 of the respective sleeves or members adapted to set up substantial resistance to torsional movement between the sleeves. The degree of flexibility, resiliency or hardness of the units 22 also affects the magnitude of resistance to axial movement as well as angular or torsional movement of one sleeve with respect to the other. By using a material of increased hardness or of reduced flexibility or yieldability, the resistance of the units to distortion is substantially increased and hence the resistance of the units to axial, torsional or angular movements of one sleeve with respect to the other may be, in a large measure, controlled by the characteristics of the material of which the units 22 are formed.

Other factors bearing upon the resistance of the units to distortion are the depth of the recesses in the sleeves accommodating the inner and outer regions of the units 22 and the extent of radial compression of the units.

If desired, the recesses or depressions 26 and 28 accommodating the annular elements may be formed directly in the members 18 and 20 in lieu of the sleeves 10 and 12, but the use of the sleeves is preferred to facilitate the manufacture and installation of the mounting construction.

Thus, depending upon the particular use or installation of the arrangement to attain desired function or results, the diameters of the sleeves, the shape or contour of the depressions or recesses 26 and 28, the depth of the region 14 between the sleeves, the thickness of the yieldable units 22, the depth of the depressions and the hardness or degree of resilience or yieldability of the units 22 may be correlated, varied and controlled to attain a desired magnitude of resistance suitable for particular purposes.

It is to be understood that the connection or mounting construction of the invention may be made in various sizes and with various distortion resistance factors as above mentioned rendering the arrangement suitable for many and various uses.

The yieldable units 22 are preferably not bonded or otherwise secured or adhesively joined to either of the sleeves 10 or 12 but are held in place by the stresses set up by distortion of the units in assembled positions with the sleeves.

In assembling the units 22 with the sleeves, the units may be "shot" into position by high pressure or impact exerted directly upon the unit in a direction axially of the sleeves. Specifically, the units 22 in the arrangement shown in Figure 1 are individually and successively moved into place by the conventional "shooting" method or by prolonged application of constant pressure exerted axially of the sleeve against the unit to progressively distort the same into position, the material of the units expanding or returning to its initial configuration when the unit is in registration with a pair of the recesses 26 and 28.

The resilient connection or mounting means of the invention may be used or is adaptable for use in mounting engines for both stationary and vehicle uses, for resiliently supporting various mechanism components upon frame constructions, suspension systems for vehicles, shock absorbers, vibration attenuators, trucks, buses, farm implements, wheel mountings, torsion bar mountings, steering linkage, hauling and construction equipment, or the same may be used wherever a member is capable of relative movement and means is necessary or desirable in yieldably resisting such movement.

Figure 4 illustrates a modified form of the arrangement shown in Figure 1. In this form of the invention the inner sleeve 40 is formed with a smooth exterior cylindrical surface. The inner surface of the outer cylindrically shaped sleeve 12' is fashioned with peripheral depressions or recesses 28' of the same character as the recesses 28 shown in Figures 1 and 3. The resilient or yieldable units 22' are assembled in engagement with the smooth-surfaced area of the exterior surface 42 of the sleeve 40 and extending into the recesses or depressions 28' formed in the sleeve 12', the units being under radial compression sufficient to provide the desired resistance characteristics to axial, torsional and angular movements of one sleeve with respect to the other.

In this form of the invention, the inner regions of the units 22' under compression are distorted to flat areas 44 and the portions 30' of the units are distorted axially in the same manner as illustrated in Figure 3.

The distorted portions 30' and the exterior regions of the units engaged or nesting in the recesses 28' resist axial deformation, the magnitude of the resistance to relative movement of the sleeves being dependent upon the size of the units 22', the yieldability or hardness of the material of which they are formed, and the extent of radial compressive stress set up in the units in assembly with the sleeves.

Figure 5 illustrates another modification of the arrangement shown in Figure 4. In this form, the outer region of the inner sleeve 10" is formed with circular recesses or depressions 26" to receive the inner surface regions of the resilient units 22" in the manner illustrated in Figure 5.

The inner wall 48 of the outer sleeve 50 is smooth or uninterrupted and the units 22" have their outer surface regions engaging the inner surface 48. The units 22", as in the other forms of the invention, are under radial compressive stresses of sufficient magnitude and the region 14" between the sleeves is of a depth so as to flatten the regions of the units in contact with the wall 48 as illustrated at 54.

The functioning of the arrangement shown in Figure 5 is similar to that shown in Figure 4. The resilient units 22' and 22" in the forms of the invention shown in Figures 4 and 5 may be assembled into proper position in the same manner as hereinbefore described in connection with the form of the invention shown in Figure 1.

Figure 6 illustrates a modified cross sectional shape for the recess accommodating a resilient annular element providing for substantially free limited movement in an axial direction of one member with respect to the other of the mounting construction. As shown in Figure 6, the sleeve or one of the components or members 60 of the mounting construction, which may be formed in a sleeve member such as the member 12 shown in Figure 1 or may be formed directly in a member similar to member 20 indicated in Figure 1, is provided with a circular recess 62 having a cylindrically shaped wall 64 terminating axially in curved portions 65 which are normally spaced lengthwise from the annular member 22'. In the arrangement shown in Figure 6, relative axial movements may take place between the sleeves or other members in contact with the annular member 22" without an increase in resistance to axial movement until a region of the annular element 22' engages one of the curved end zones 65 of the recess 62 to set up increased resistance to such movement.

Figure 7 illustrates another form similar to Figure 6 in which the circular recess 68 formed in the member 69 accommodating the resilient annular member 22" is fashioned with an intermediate or central surface 70 terminating axially in curved portions 72 of small radii. The surface 70 of the recess is of slight curvature in a direction lengthwise of the member 69 forming a concave configuration which is engaged by the annular member 22". Through the concave curvature of the surface 70, axial movement of member 69 relative to the other component or member of the character indicated at 10 in Figure 1, establishes a progressively increasing resistance during movement of member 69 relative to the annular element 22' in an axial direction. The concavity of the surface 70 progressively effects an increased distortion and compression of the annular member 22" whereby progressively increasing resistance is set up when member 69 moves in an axial direction.

It is to be understood that other configurations or shapes may be utilized for the walls of the recesses accommodating the resilient annular elements dependent upon the extent of relative free axial movement desired and the degree or amount of distortion or compression of the resilient annular elements. While in all forms of the arrangement disclosed, the annular elements are illustrated of substantially circular cross sectional configuration, it is to be understood that they may be fashioned of elliptical or other suitable cross sectional configuration suitable for accomplishing the object and purposes of the invention.

It is apparent that, within the scope of the invention, modifications and different arrangements may be made other than is herein disclosed, and the present disclosure is illustrative merely, the invention comprehending all variations thereof.

I claim:

1. A yieldable connection of the character disclosed, in combination, an inner member having an outer circular cylindrical surface, an outer member having a circular cylindrical inner surface, said surfaces being spaced to form an annular chamber, at least one of said surface regions being formed with a plurality of peripheral recesses spaced longitudinally of the member and of circular cross section, and individual annular elements of circular cross section formed of yieldable material extending into the recesses and engaging the other member, said elements disposed between the members being under radially directed compression establishing a friction connection between the members adapted to resist axial and torsional movements of one member relative to the other, and means for venting the region between adjacent annular elements.

2. A yieldable connection of the character disclosed, in combination, an inner member having a plurality of longitudinally spaced peripheral recesses, an outer member having a plurality of interiorly disposed, longitudinally spaced recesses, the recesses in said inner and outer members being concentrically arranged and spaced to form annular regions, annular elements of yieldable material disposed in the pairs of recesses and being under compression to establish a friction connection between the members, and a vent opening in one of said members in communication with the region between adjacent annular elements to equalize the air pressure in said region.

3. A yieldable conection of the character disclosed, in combination, an inner member having an outer circular cylindrical surface, an outer member having a circular cylindrical inner surface, said members being secured respectively to relatively movable bodies, said surfaces being spaced to define an annular region, at least one of said surface regions being formed with a plurality of longitudinally spaced peripheral recesses, annular members formed of yieldable material disposed in the recesses and engaging the circular cylindrical surface of the other member, said elemts disposed in the annular region between the members being under compression establishing a friction connection between the members to resist axial and torsional movements of one member relative to the other, and means for venting the region between adjacent annular members.

References Cited in the file of this patent

UNITED STATES PATENTS

| | | |
|---|---|---|
| 1,856,646 | Lee | May 3, 1932 |
| 2,004,712 | Thiry | June 11, 1935 |
| 2,245,153 | McWane | June 10, 1941 |

FOREIGN PATENTS

| | | |
|---|---|---|
| 9,765 | Great Britain | May 16, 1883 |
| 131,649 | Switzerland | May 1, 1929 |
| 163,106 | Austria | May 25, 1949 |